(12) United States Patent
Park

(10) Patent No.: US 9,086,216 B2
(45) Date of Patent: Jul. 21, 2015

(54) ILLUMINATED CONTROL PANEL ASSEMBLY

(71) Applicant: SAMSUNG ELECTRONICS CO., LTD., Suwon-si, Gyeonggi-do (KR)

(72) Inventor: Jong Won Park, Seongnam-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 0 days.

(21) Appl. No.: 14/535,847

(22) Filed: Nov. 7, 2014

(65) Prior Publication Data

US 2015/0062866 A1 Mar. 5, 2015

Related U.S. Application Data

(63) Continuation of application No. 13/861,200, filed on Apr. 11, 2013, now Pat. No. 8,950,882.

(30) Foreign Application Priority Data

Apr. 12, 2012 (KR) ........................ 10-2012-0037716

(51) Int. Cl.
*H01H 9/16* (2006.01)
*F21V 33/00* (2006.01)
*D06F 39/00* (2006.01)
*F21K 99/00* (2010.01)
*F21V 23/04* (2006.01)
*F21W 131/30* (2006.01)
*F21Y 101/02* (2006.01)

(52) U.S. Cl.
CPC ............ *F21V 33/0044* (2013.01); *D06F 39/00* (2013.01); *D06F 39/005* (2013.01); *F21K 9/50* (2013.01); *F21K 9/52* (2013.01); *F21V 23/04* (2013.01); *F21W 2131/30* (2013.01); *F21Y 2101/02* (2013.01)

(58) Field of Classification Search
CPC ....... G01D 11/28; H01H 9/161; H01H 9/162; H01H 9/182
See application file for complete search history.

(56) References Cited

U.S. PATENT DOCUMENTS 7,394,034 B2 * 7/2008 Ostendorf et al. ............ 200/314
8,049,124 B2 11/2011 Jang et al.
(Continued)

FOREIGN PATENT DOCUMENTS

CN 2012245779 5/2009
EP 2031112 A1 8/2008
(Continued)

OTHER PUBLICATIONS

Extended European Search Report mailed Aug. 16, 2013 in corresponding European Application No. 13163015.
(Continued)

*Primary Examiner* — Ismael Negron
(74) *Attorney, Agent, or Firm* — Staas & Halsey LLP

(57) ABSTRACT

A control panel assembly includes a control panel; a plurality of light emitting diodes (LED); and an LED bracket to accommodate the plurality of LEDs, the LED bracket including a plurality of light guide holes, each of the plurality of light guide holes being configured to guide light from one of the plurality of LEDs. Each of the plurality of light guide holes includes a first portion to accommodate one of the plurality of LEDs; and a second portion to guide light emitted from the LED accommodated in the first portion, a cross-sectional area of the first portion decreases toward the second portion.

16 Claims, 9 Drawing Sheets

(56) References Cited

U.S. PATENT DOCUMENTS

| | | |
|---|---|---|
| 2003/0028261 A1 | 2/2003 | Peterson et al. |
| 2008/0036627 A1 | 2/2008 | Lim et al. |
| 2008/0062673 A1 | 3/2008 | Hwang et al. |
| 2008/0289940 A1 | 11/2008 | Kim et al. |

FOREIGN PATENT DOCUMENTS

| | | | | |
|---|---|---|---|---|
| KR | 2003-0092190 | | 12/2003 | |
| KR | 10-2006-0031064 | * | 4/2006 | .............. D06F 39/00 |
| KR | 10-2008-0103643 | | 11/2008 | |
| WO | 2007/075038 | | 7/2007 | |

OTHER PUBLICATIONS

Office Action mailed Sep. 4, 2014 in related U.S. Appl. No. 13/861,200.

Notice of Allowance mailed Nov. 6, 2014 in related U.S. Appl. No. 13/861,200.

U.S. Appl. No. 13/861,200, filed Apr. 11, 2013, Jong Won Park, Samsung Electronics Co., Ltd.

* cited by examiner

ILLUMINATED CONTROL PANEL ASSEMBLY

CROSS-REFERENCE TO RELATED APPLICATIONS

This application is a continuation of U.S. application Ser. No. 13/861,200, filed on Apr. 11, 2013, which claims the benefit of Korean Patent Application No. 10-2012-0037716, filed on Apr. 12, 2012 in the Korean Intellectual Property Office, the disclosure of which is incorporated herein by reference.

BACKGROUND

1. Field

Embodiments of the present disclosure relate to a control panel assembly for controlling an operation of a washing machine and a washing machine having the same.

2. Description of the Related Art

A washing machine as a machine that washes clothes using power, generally includes a tub in which washing water is stored, a drum rotatably installed in the tub, and a driving motor for rotating the drum. When the drum is rotated in a state in which laundry and detergent water are put into the drum, laundry is in friction with the drum and detergent water so that dirt can be removed from laundry.

In general, the washing machine includes a control panel assembly disposed at an upper part of a front side of a main body that constitutes the exterior so as to control an operation of the washing machine.

As disclosed in Korean Patent Publication No. 10-2008-0103643, the control panel assembly includes a circuit board on which electric components, such as a rotary switch and a light emitting diode (LED), are installed, a control panel that covers the circuit board so as to protect a substrate, a rotary knob rotatably disposed on the control panel for user manipulation, and a display panel disposed on the periphery of the rotary knob. Light emitted from the LED is transmitted forward through the display panel via guide components inside the control panel.

However, in the control panel assembly, light emitted from the LED may be diffused into a different position from a predetermined position of the display panel, or intensity of the light emitted from the LED is not uniform according to a position of the display panel.

In order to solve these problems, a film is disposed between the LED and the display panel so as to remove diffusion of light or so as to uniformly diffuse light. However, due to an increase in cost required for manufacturing the film and an increase in assembling time required for attaching the film to the control panel assembly, productivity is lowered.

SUMMARY

Therefore, it is an aspect of the present disclosure to provide a control panel assembly having an improved structure in which light emitted from a light emitting diode (LED) may be uniformly diffused, and a washing machine having the control panel assembly.

Additional aspects of the disclosure will be set forth in part in the description which follows and, in part, will be apparent from the description, or may be learned by practice of the disclosure.

In accordance with one aspect of the present disclosure, there is provided a washing machine having a control panel assembly for controlling an operation of the washing machine, wherein the control panel assembly includes: a control panel; a circuit board disposed at an inner side of the control panel; at least one light emitting diode (LED) disposed on the circuit board and configured to emit light; an LED bracket coupled to the circuit board, configured to accommodate the at least one LED to guide light emitted from the LED to front of the control panel, and having at least one light guide hole, of which a cross-sectional area is not uniform in at least a portion of the light guide hole in a direction in which the light emitted from the LED is guided; and an LED window disposed at a front side of the LED bracket and configured to allow the light emitted from the LED to be transmitted to front of the control panel.

The light guide hole may include: first light guide holes configured to accommodate the LED; and second light guide holes formed to have a step height with respect to the first light guide holes.

Each second light guide hole may be relatively longer than each first light guide hole.

A cross-sectional area of each first light guide hole may be gradually decreased and a cross-sectional area of each second light guide hole may be gradually increased along a proceeding path of the light emitted from the at least one LED.

The LED window may include: a light transmission part configured to allow the light emitted from the LED to be transmitted to front of the control panel; and a light diffusion part configured to allow the light emitted from the LED to be uniformly diffused when passing through the light transmission part, and the light diffusion part may include uneven forms formed at a rear side of the LED window corresponding to the front side of the LED bracket.

The LED window may include: a light transmission part configured to allow the light emitted from the LED to be transmitted to front of the control panel; and a light diffusion part configured to allow the light emitted from the LED to be uniformly diffused when passing through the light transmission part, and the light diffusion part may include a film member attached to or inserted into the LED window.

The light transmission part may include light transmission protrusions disposed in positions corresponding to the light guide hole on a path of the light emitted from the at least one LED, and the light guide hole may be provided in a polygonal form so as to prevent light emitted from the LED from being diffused into other light transmission protrusions than the light transmission protrusions corresponding to the light guide hole.

The control panel assembly may include a knob guide disposed at a front side of the LED window and a rotary knob rotatably mounted on the knob guide, and the light guide holes may be spaced apart from each other by a predetermined gap in a ring form based on a rotation shaft of the rotary knob, and the light transmission part may include a plurality of light transmission protrusions spaced apart from each other by a predetermined gap in positions corresponding to the light guide holes based on the rotation shaft of the rotary knob.

The knob guide may include a plurality of through holes formed in positions corresponding to the plurality of light transmission protrusions so that the plurality of light transmission protrusions are inserted into the plurality of through holes and are exposed to a front side of the control panel.

The LED bracket and the LED window may be formed integrally with each other.

In accordance with another aspect of the present disclosure, there is provided a control panel assembly for controlling an operation of an electronic product, including: a control panel; a circuit board disposed at an inner side of the control panel; at least one light emitting diode (LED) disposed on the circuit board and configured to emit light; a light guide part coupled to the circuit board, configured to accommodate the at least one LED, and having at least one light guide hole, of which a cross-sectional area is not uniform in at least a portion of the light guide hole in a direction in which the light emitted from the LED is guided; a light transmission part coupled to the control panel and having a base plate disposed at front of the light guide part and at least one light transmission protrusion configured to protrude from a front side of the base plate and allow light passing through the light guide hole to be transmitted to front of the control panel; and a light diffusion part disposed at a rear side of the base plate in an uneven form and configured to allow the light emitted from the LED to be uniformly diffused when passing through the light transmission protrusion.

The light guide hole may include: first light guide holes configured to accommodate the LED; and second light guide holes formed to have a step height with respect to the first light guide holes.

A cross-sectional area of each second light guide hole may be smaller than a cross-sectional area of each first light guide hole.

The cross-sectional area of each first light guide hole may be gradually decreased and the cross-sectional area of each second light guide hole may be gradually increased along a proceeding path of the light emitted from the at least one LED.

The cross-sectional area of the light guide hole may be provided in a polygonal form.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
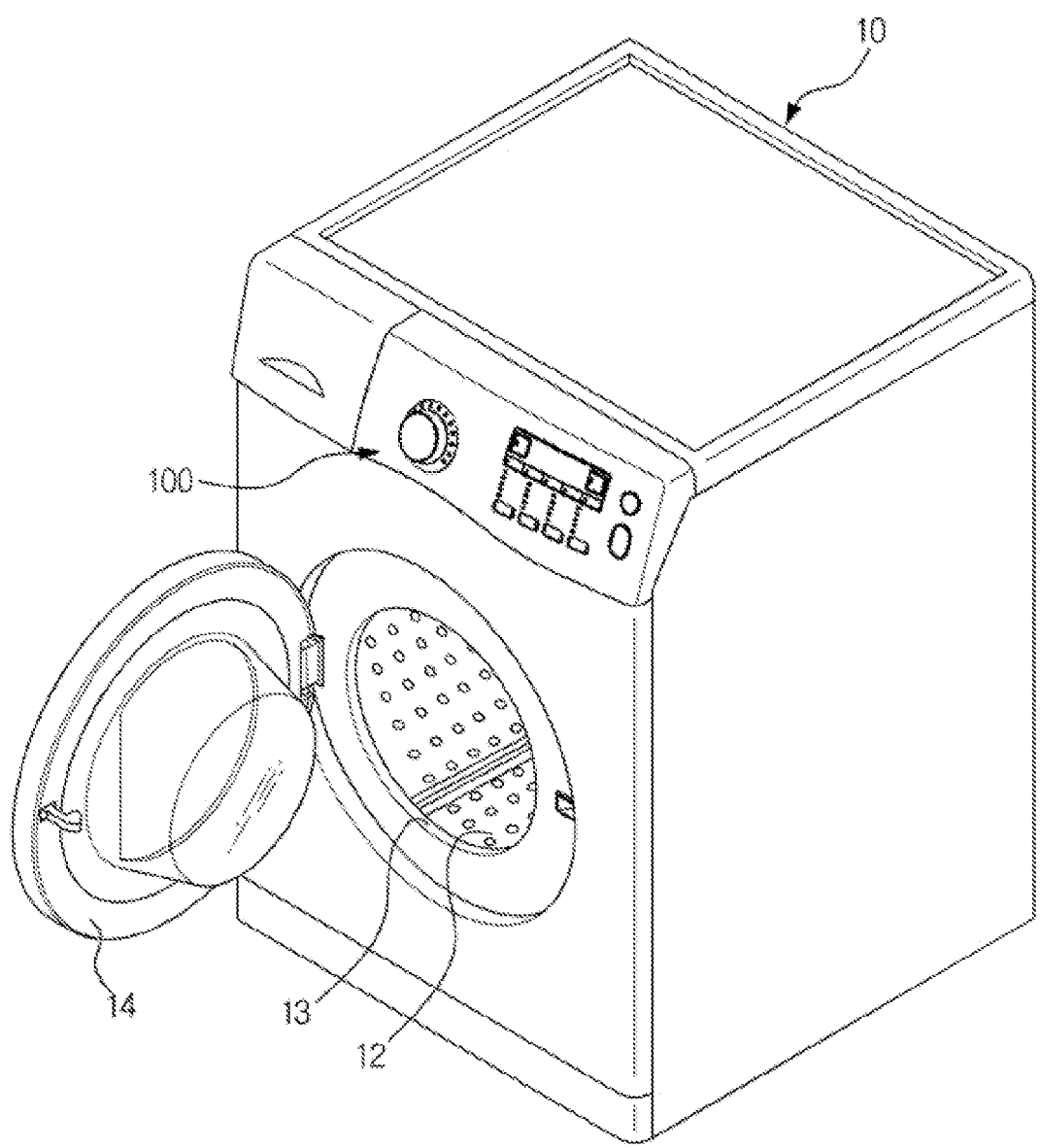
FIG. 1 is a perspective view illustrating the exterior of a washing machine according to an embodiment of the present disclosure.

Reference will now be made in detail to the embodiments of the present disclosure, examples of which are illustrated in the accompanying drawings, wherein like reference numerals refer to like elements throughout.

FIG. 1 is a perspective view illustrating the exterior of a washing machine according to an embodiment of the present disclosure.

As illustrated in FIG. 1, the washing machine includes a main body 10 that constitutes the exterior, a tub (not shown) which is installed in the main body 10 and in which washing water is stored, and a drum 12 that is rotatably disposed in the tub so as to wash laundry. A laundry port 13 through which laundry may be put into the drum 12, is formed at a front side of the main body 10, and a door 14 is installed to open/close the laundry port 13. A control panel assembly 100 is disposed at an upper part of the front side of the main body 10 so that a user may control an operation of the washing machine.

Figure 2:
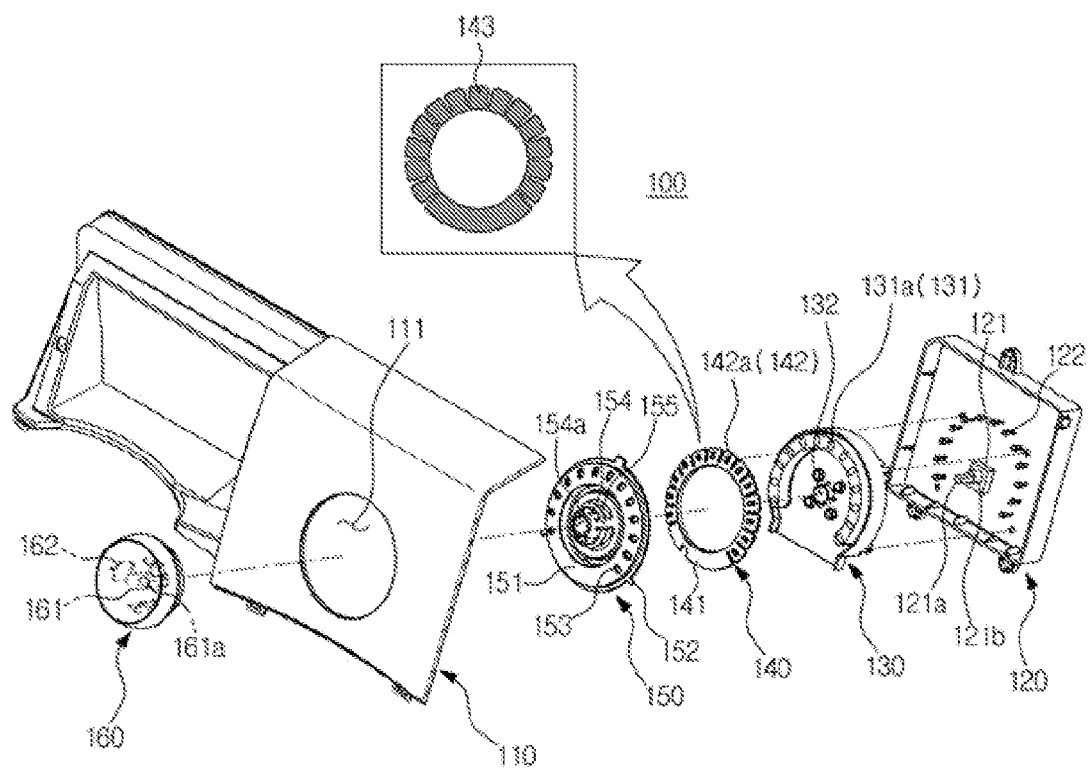
FIG. 2 is an exploded perspective view illustrating a structure of a control panel assembly of the washing machine illustrated in FIG. 1, according to an embodiment of the present disclosure.
Figure 3:
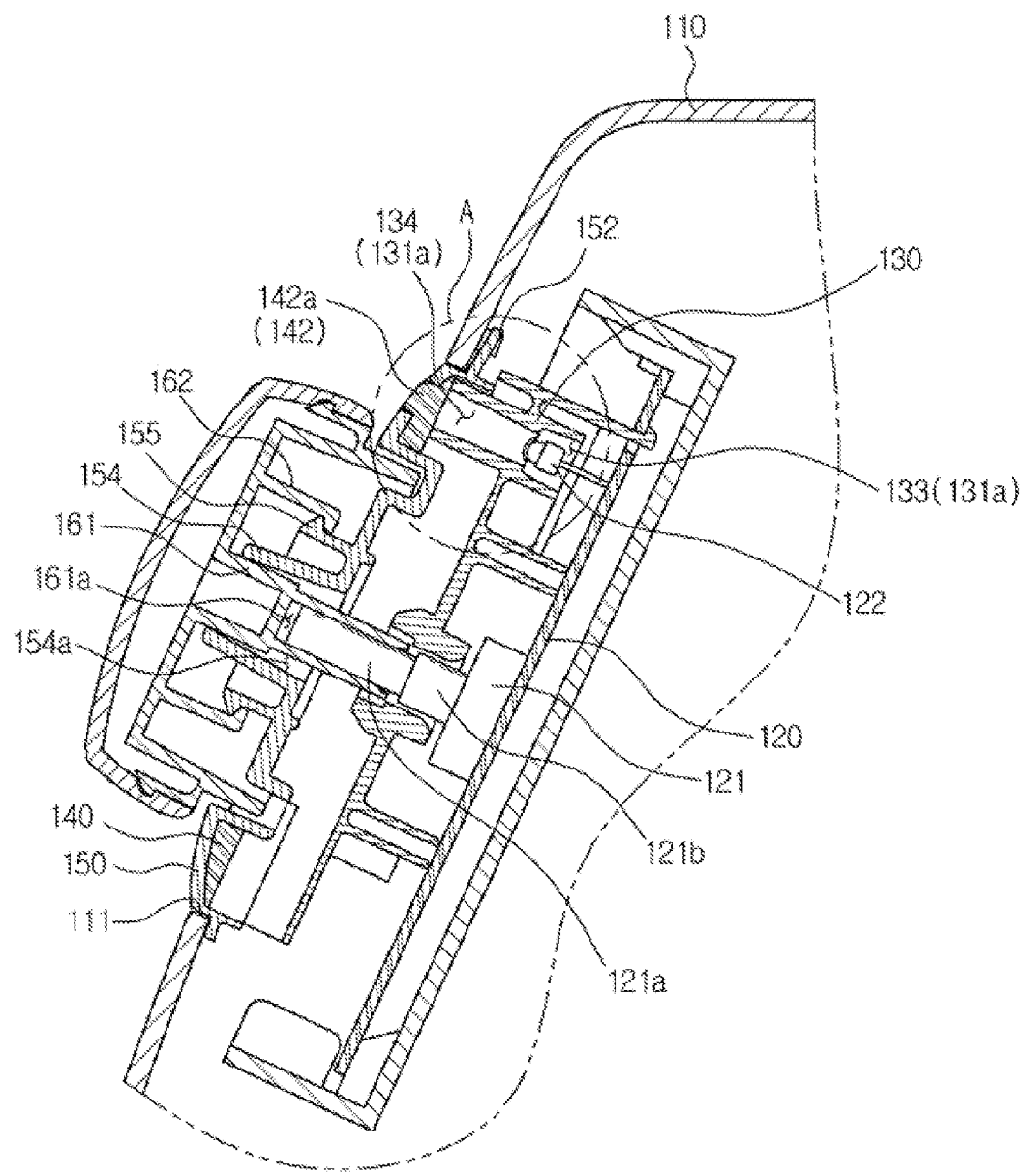
FIG. 3 is a cross-sectional view illustrating a combined state of the control panel assembly illustrated in FIG. 2.
Figure 4:
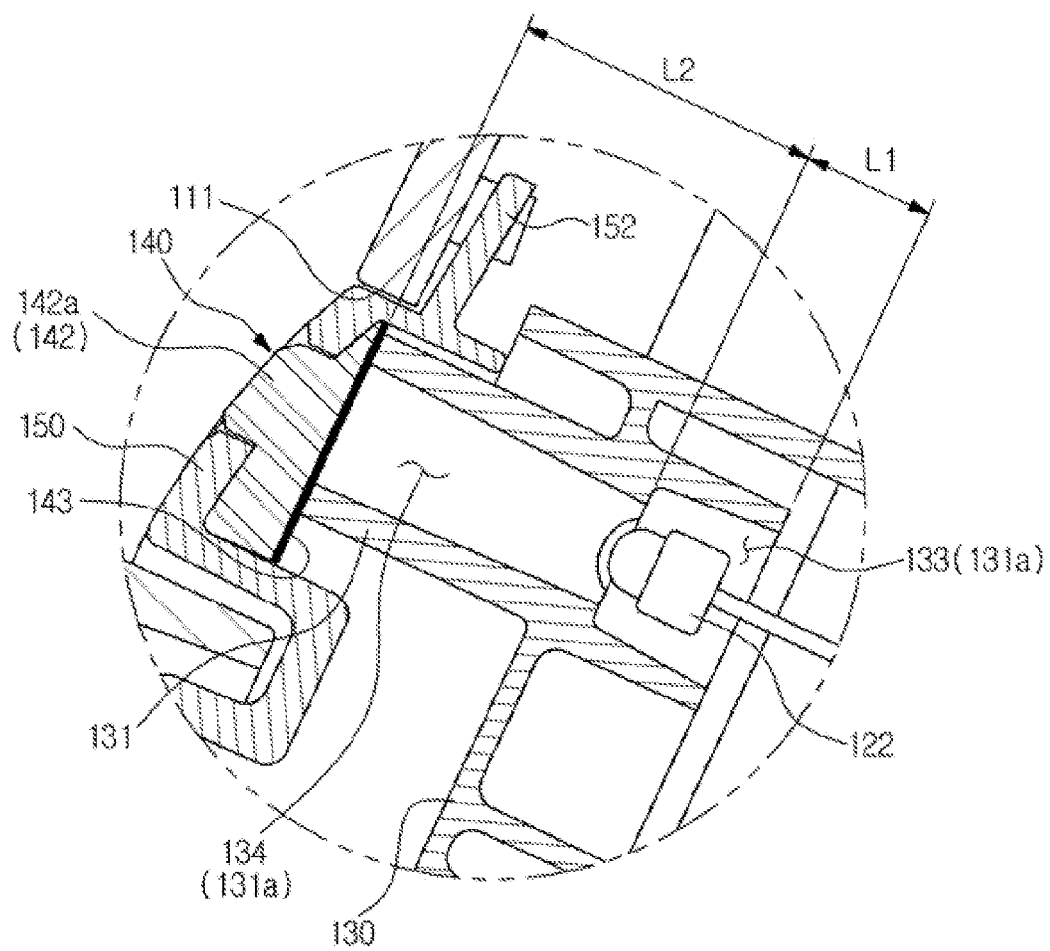
FIG. 4 is an enlarged cross-sectional view of a portion A of FIG. 3.
Figure 5:
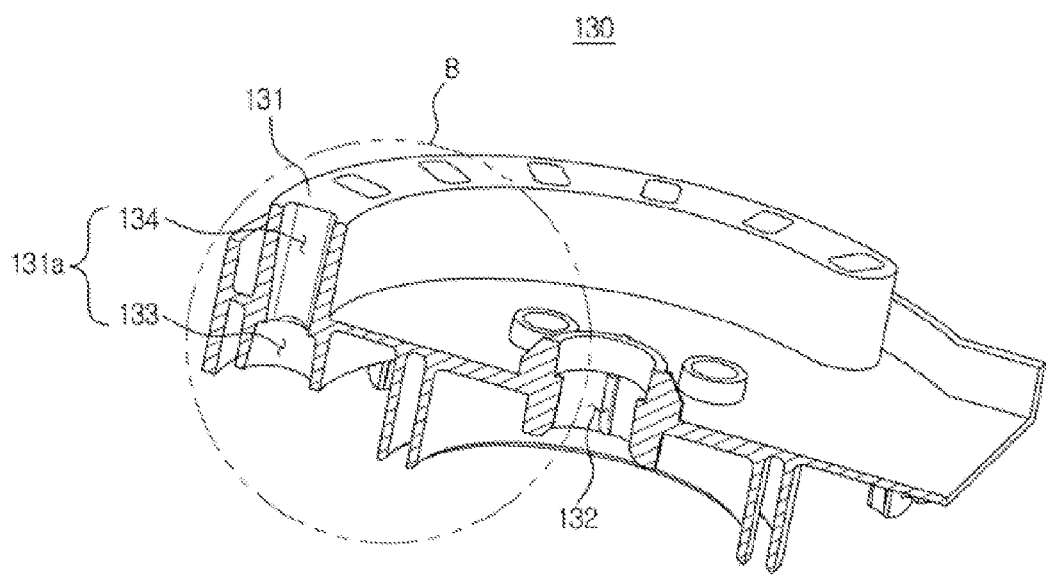
FIG. 5 is a cross-sectional view of a light emitting diode (LED) bracket.
Figure 6:
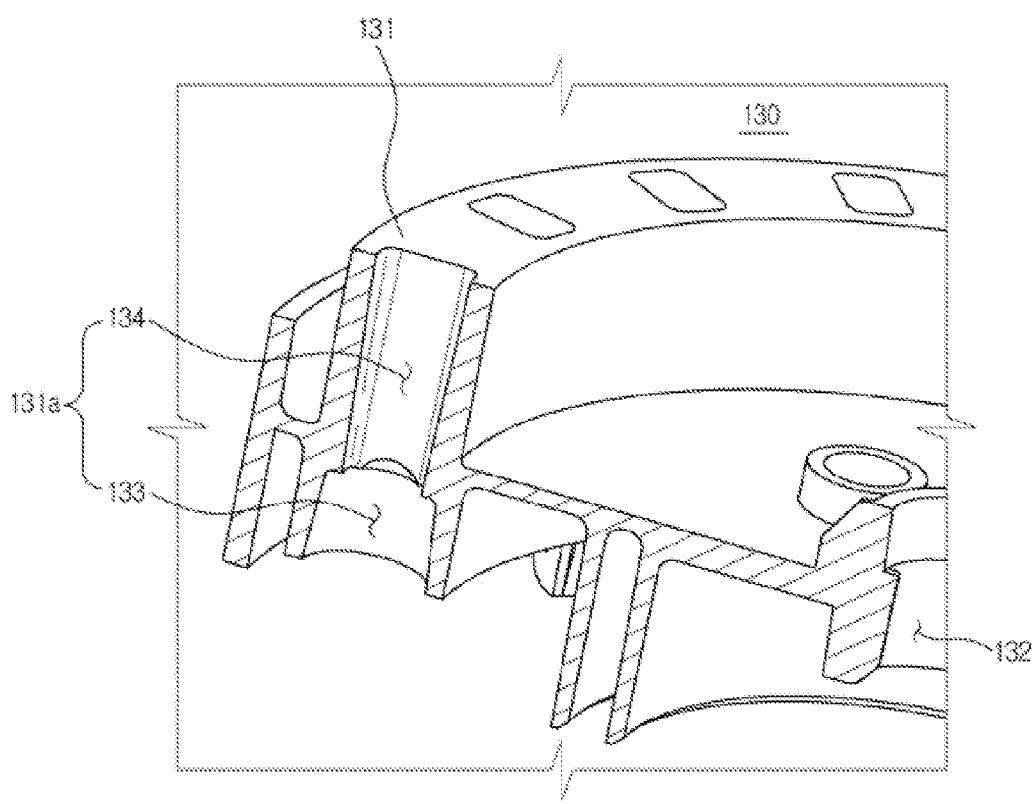
FIG. 6 is an enlarged view of a portion B of FIG. 5.

FIG. 2 is an exploded perspective view illustrating a structure of the control panel assembly 100 of the washing machine illustrated in FIG. 1, according to an embodiment of the present disclosure, FIG. 3 is a cross-sectional view illustrating a combined state of the control panel assembly 100 illustrated in FIG. 2, FIG. 4 is an enlarged cross-sectional view of a portion A of FIG. 3, FIG. 5 is a cross-sectional view of a light emitting diode (LED) bracket, and FIG. 6 is an enlarged view of a portion B of FIG. 5.

As illustrated in FIGS. 2 through 6, the control panel assembly 100 includes a control panel 110 having one side in which an opening 111 is formed and a circuit board 120 mounted at an inner side of the control panel 110.

A rotary switch 121 is installed at the circuit board 120, and a plurality of LEDs 122 are installed on the periphery of the rotary switch 121. The rotary switch 121 includes a push shaft 121a that protrudes forward and a rotation shaft 121b that surrounds a lower side of the push shaft 121a. A rotary knob 160 is combined with the rotary switch 121. The user may rotate the rotation shaft 121b of the rotary switch 121 via the rotary knob 160 or may press the push shaft 121a to select various operations of the washing machine, such as a washing course, a washing time, and the like.

Also, an LED bracket 130 is installed at the circuit board 120. The LED bracket 130 includes a light guide part 131 that accommodates and protects the plurality of LEDs 122 and simultaneously guides light emitted from the LEDs 122 toward the front of the control panel 110.

A first through hole 132 through which the rotation shaft 121b and the push shaft 121a of the rotary switch 121 pass, is formed in the center of the LED bracket 130.

The light guide part 131 includes a plurality of light guide holes 131a that are formed on the periphery of the first through hole 132 and are spaced apart from each other by a predetermined gap in a circumferential direction of the LED bracket 130.

As shown in FIG. 3, the plurality of light guide holes 131a include first light guide holes 133 in which the LEDs 122 are accommodated and second light guide holes 134 formed to have a step height with respect to the first light guide holes 133. The first light guide holes 133 and the second light guide holes 134 may be formed in an approximately rectangular form so as to prevent light emitted from the LEDs 122 from being diffused. That is, the first light guide holes 133 and the second light guide holes 134 are provided in the rectangular form. Thus, when light emitted from the LEDs 122 passes through the light guide holes 131a, the light is guided toward one light transmission protrusion 142a disposed in a position corresponding to the light guide holes 131a on a path of light emitted from the LEDs 122 and proceeds, thereby preventing light from being diffused to other light transmission protrusions that do not correspond to the light guide holes 131a. Furthermore, since the second light guide holes 134 are formed to have a step height with respect to the first light guide holes 133 and the cross-sectional area of each second light guide hole 134 is smaller than that of each first light guide hole 133, there is the effect of focusing light emitted from the LEDs 122.

The cross-sectional area of the first light guide hole 133 may be gradually decreased and the cross-sectional area of the second light guide hole 134 may be gradually increased along the proceeding path of light emitted from the LEDs 122, so as to easily remove a mold for forming the first light guide holes 133 and the second light guide holes 134 when the LED bracket 130 is injection molded using plastic.

The shape of the first light guide holes 133 and the second light guide holes 134 is not limited to the rectangular shape and may be all polygonal shapes in which diffusion of light emitted from the LEDs 122 may be prevented.

Also, each second light guide hole 134 may be relatively longer than each first light guide hole 133, so as to allow light emitted from the LEDs 122 to be further focused when light emitted from the LEDs 122 proceeds forward along the second light guide holes 134.

The degree to which light emitted from the LEDs 122 is focused may be determined by a ratio (L2/L1) of a length L2 of the second light guide hole 134 to a length L1 of the first light guide hole 133. The ratio (L2/L1) of the length L2 of the second light guide hole 134 to the length L1 of the first light guide hole 133 may be approximately equal to or greater than 1.5 and equal to or less than 5. The reason why the ratio (L2/L1) of the length L2 of the second light guide hole 134 to the length L1 of the first light guide hole 133 has a predetermined range is that, as the length L2 of the second light guide hole 134 increases, the effect of focusing light emitted from the LEDs 122 increases but the thickness of the LED bracket 130 in which the second light guide holes 134 are formed increases. Of course, the ratio (L2/L1) of the length L2 of the second light guide hole 134 to the length L1 of the first light guide hole 133 is not limited to being equal to or greater than 1.5 and equal to or less than 5 and may be equal to or less than 1.5 or equal to or greater than 5 according to design specifications.

In this way, the cross-sectional areas or lengths of the light guide holes 131a may be properly adjusted so that light emitted from the LEDs 122 may reach a desired position with a desired degree of focusing.

An LED window 140 and a knob guide 150 are installed at the opening 111 of the control panel 110, and the rotary knob 160 is combined with the front of a knob guide 150. The knob guide 150 supports the rotary knob 160 and prevents movement of the rotary knob 160. The LED window 140 serves to display a function selected through a rotation or pressing operation of the rotary knob 160, so that the user may identify the function.

The LED window 140 includes a ring-shaped base plate 141 coupled to a rear side of the knob guide 150, a light transmission part 142 formed in a circumferential direction of the ring-shaped base plate 141, and a light diffusion part 143 formed at a rear side of the base plate 141 corresponding to the front side of the LED bracket 130.

The light transmission part 142 includes a plurality of light transmission protrusions 142a that are spaced apart from each other by a predetermined gap in the circumferential direction of the ring-shaped base plate 141 and protrude from the front side of the base plate 141 so that light passing through the light guide holes 131a of the LED bracket 130 may be transmitted to the front of the control panel 110.

The light diffusion part 143 is configured in many uneven forms formed in units of approximately several micrometers to several hundreds of micrometers at the rear side of the base plate 141. The uneven forms may be formed by performing corrosion treatment on the rear side of the base plate 141 or by mechanical processing and may be pre-formed on a mold for injection-molding the LED window 140.

Also, instead of forming protrusions in the uneven forms at the rear side of the base plate 141, the light diffusion part 143 may be provided by attaching a thin material, such as a film, of which surface treatment for diffusing light is performed, to the front side or rear side of the base plate 141 of the LED window 140 or by inserting the thin material, such as the film, when the LED window 140 is injection molded.

The light diffusion part 143 allows light emitted from the LEDs 122 and passing through the LED bracket 130 to be uniformly diffused into one light transmission protrusion 142a and to be transmitted by the light transmission protrusions 142a, thereby generating the effect of appealing lighting.

The LED bracket 130 and the LED window 140 may be formed integrally with each other using a manufacturing method, such as injection molding. In this case, since it is not easy to additionally form uneven protrusions at the rear side of the base plate 141, the thin material, such as the film, of which surface treatment for diffusing light is performed, may be inserted when the LED bracket 130 and the LED window 140 are integrally injection molded.

The knob guide 150 includes a base panel 151 on which the rotary knob 160 is mounted, hanging jaws 152 that protrude from a circumference of the base panel 151, and a plurality of second through holes 153 that are spaced apart from each other by a predetermined gap in the circumferential direction of the base panel 151. A character or symbol is printed on the circumference of the base panel 151 so that the user may identify an operation selected by the rotary knob 160. The hanging jaws 152 are hung on the periphery of the opening 111 when the knob guide 150 is installed at the control panel 110. The plurality of second through holes 153 are formed through the base panel 151 in a position corresponding to the light transmission protrusions 142a so that the plurality of light transmission protrusions 142a may be inserted into the plurality of second through holes 153 and may be exposed to the front side of the control panel 110.

Also, the knob guide 150 includes a boss insertion part 154 that protrudes from the center of the knob guide 150 and at least one first hook 155 disposed on a circumference of the boss insertion part 154. The boss insertion part 154 includes a boss insertion hole 154a through which a boss 161 of the rotary knob 160 may be inserted into the boss insertion part 154. The boss insertion part 154 confines the boss 161 of the rotary knob 160 so as to prevent movement of the rotary knob 160. The first hook 155 allows a second hook 162 of the rotary knob 160 to be engaged with the first hook 155 so that the rotary knob 160 may be rotatably mounted on the knob guide 150. Also, the first hook 155 prevents the rotary knob 160 from being deviated when the user pulls the rotary knob 160.

The rotary knob 160 includes a boss 161 that extends from an inner side of the rotary knob 160 toward the center of the knob guide 150 to a predetermined length, and at least one second hook 162 disposed on a circumference of the boss 161. The boss 161 is inserted into the boss insertion part 154 when the rotary knob 160 is mounted on the knob guide 150, and a shaft insertion hole 161a is formed in the boss 161 so that the push shaft 121a of the rotary switch 121 may be inserted into the shaft insertion hole 161a. As described above, the second hook 162 is coupled to the first hook 155 so that the rotary knob 160 may be rotatably mounted on the knob guide 150.

In FIG. 2, three first hooks 155 and three second hooks 162 are disposed in the circumferential direction of the knob guide 150 and in the circumferential direction of the rotary knob 160, respectively. However, the number of first hooks 155 and second hooks 162 may be changed according to design requirements.

Also, in FIG. 3, the first hook 155 and the second hook 162 are engaged with each other so that the rotary knob 160 may be coupled to the knob guide 150. However, a hook may be formed at either of the rotary knob 160 and the knob guide 150, and a coupling hole to be coupled to the hook is formed at the other one of the rotary knob 160 and the knob guide 150 so that the rotary knob 160 and the knob guide 150 may be coupled to each other.

Hereinafter, an operation of assembling the control panel assembly 100 of the washing machine according to the present disclosure will be described.

Figure 7A:
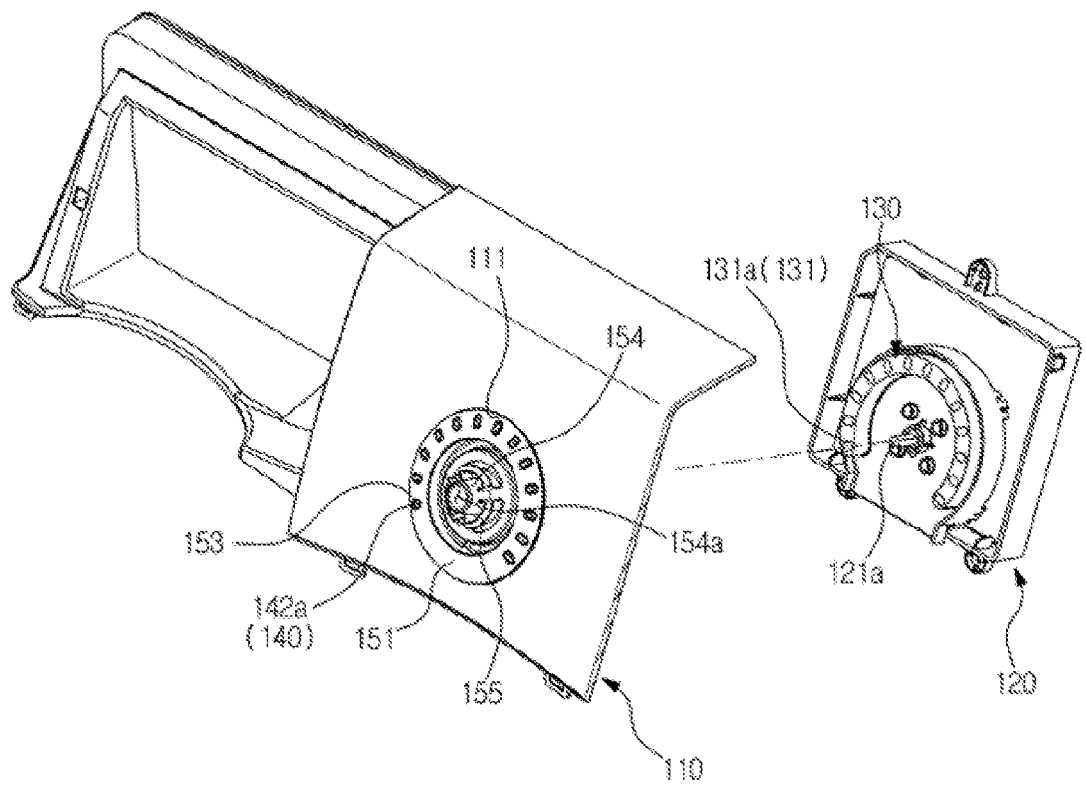
FIGS. 7A through 7C illustrate an operation of assembling the control panel assembly of FIG. 2 of the washing machine of FIG. 1, according to an embodiment of the present disclosure.
Figure 7B:
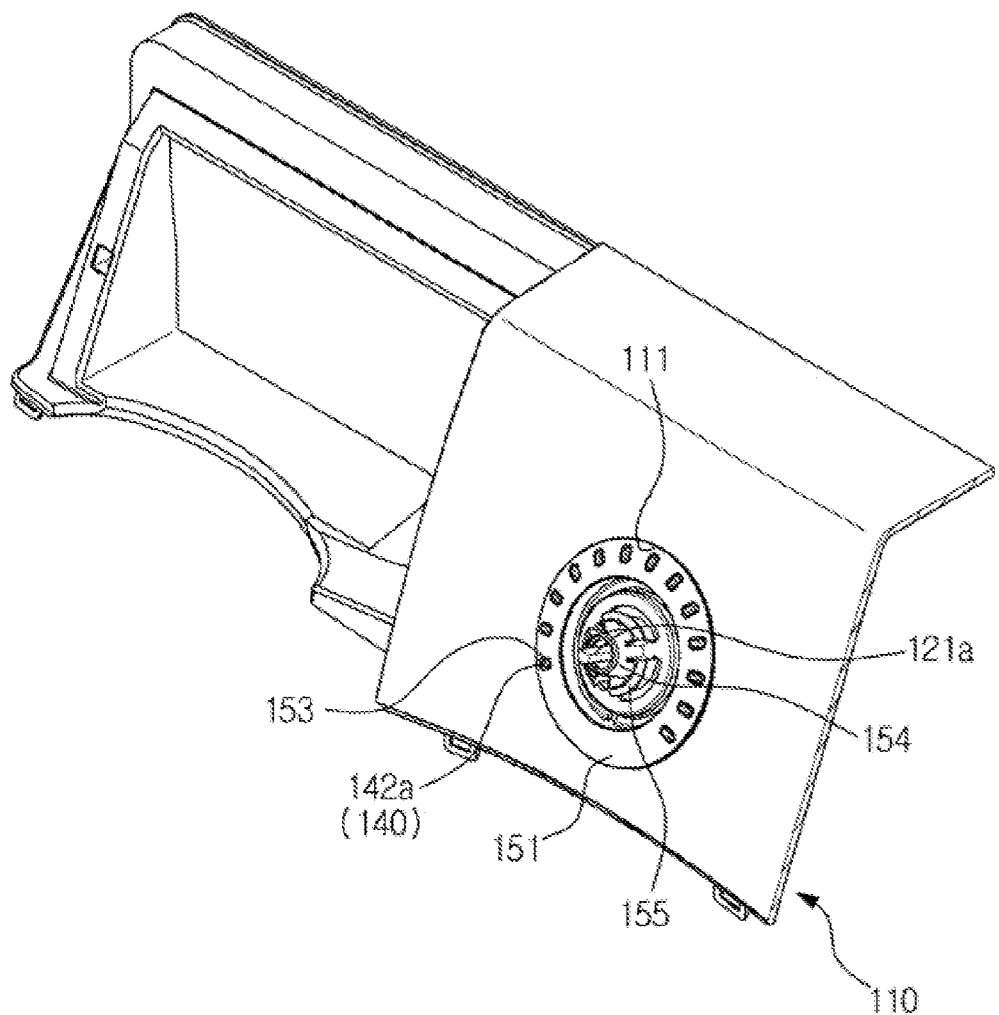
Figure 7C:
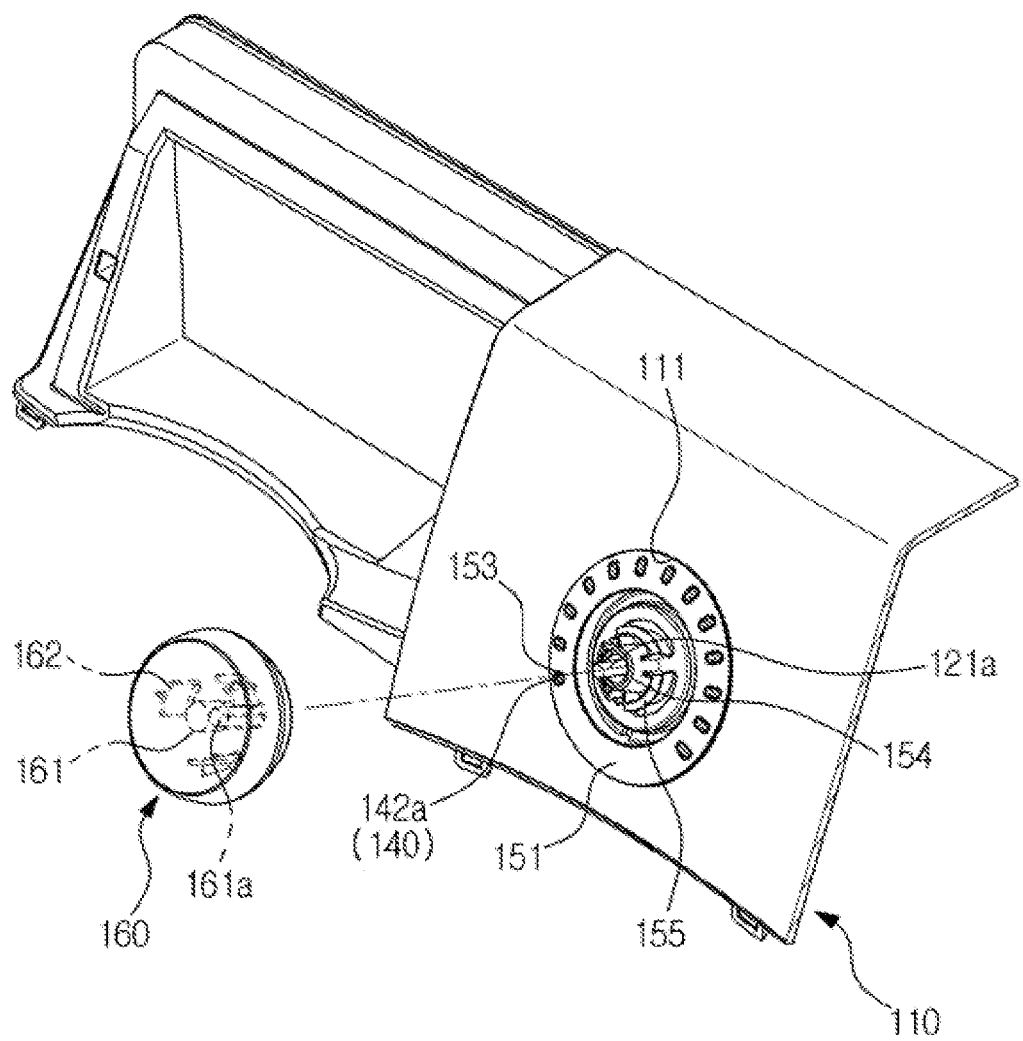

FIGS. 7A through 7C illustrate an operation of assembling the control panel assembly 100 of FIG. 2 of the washing machine of FIG. 1, according to an embodiment of the present disclosure.

First, as illustrated in FIG. 7A, when the knob guide 150 is inserted into the opening 111 of the control panel 110 at the rear of the control panel 110 in a state in which the LED window 140 is coupled to the knob guide 150, the base panel 151 and the light transmission part 142 are exposed to the front of the control panel 110 through the opening 111. The LED bracket 130 is combined with the circuit board 120 so as to accommodate and protect the rotary switch 121 and the LEDs 122 installed at the circuit board 120. In this case, the push shaft 121a and the rotation shaft 121b of the rotary switch 121 protrude forward through the first through hole 132.

Next, as illustrated in FIG. 7B, the circuit board 120 is fixed to the control panel 110 on which the knob guide 150 is installed, using a fastening member, such as a screw. Then, the push shaft 121a and the rotation shaft 121b of the rotary switch 121 are exposed to the front of the control panel 110 via the boss insertion part 154 of the knob guide 150.

Subsequently, as illustrated in FIG. 7C, the rotary knob 160 is combined with the knob guide 150 at the front of the control panel 110. In this case, the boss 161 of the rotary knob 160 is inserted into the boss insertion part 154, and the second hook 162 of the rotary knob 160 is engaged with the first hook 155 of the knob guide 150. When the boss 161 of the rotary knob 160 is inserted into the boss insertion part 154, the push shaft 121a of the rotary switch 121 is inserted into the shaft insertion hole 161a formed in the boss 161 and is coupled to the boss 161.

It is apparent that the above-described control panel assembly 100 may be applied to not only a washing machine but also all electronic products that require operation control with user manipulation, such as a drying machine, a dishwasher, and the like.

As described above, according to the embodiments of the present disclosure, since light emitted from a plurality of LEDs is uniformly diffused, the effect of appealing lighting can be achieved and good impression can be given to the user so that the reliability of a product can be improved.

In addition, no additional component, such as a film, is required so that the productivity of the product can be improved.

Although a few embodiments of the present disclosure have been shown and described, it would be appreciated by those skilled in the art that changes may be made in these embodiments without departing from the principles and spirit of the invention, the scope of which is defined in the claims and their equivalents.

What is claimed is:

1. A control panel assembly for an appliance, comprising:
   a control panel;
   a plurality of light emitting diodes (LEDs);
   an LED bracket to accommodate the plurality of LEDs, the LED bracket including a plurality of light guide holes, each of the plurality of light guide holes being configured to guide light from one of the plurality of LEDs; and
   an LED window disposed in front of the LED bracket,
   wherein each of the plurality of light guide holes comprises:
      a first portion to accommodate one of the plurality of LEDs,
      a second portion to guide light emitted from the LED accommodated in the first portion towards the LED window, and
      a cross-sectional area of the first portion decreases toward the second portion, and a cross-sectional area of the second portion increases toward the LED window.

2. The control panel assembly for the appliance according to claim 1, wherein the second portion is longer than the first portion.

3. The control panel assembly for the appliance according to claim 1, wherein a smallest cross-sectional area of each of the light guide holes is formed where the first portion and the second portion meet.

4. The control panel assembly according to claim 1, wherein the first portion has an opening with a circular cross-section and the second portion has an exit with a polygonal form cross section.

5. The control panel assembly according to claim 4, wherein the polygonal form includes a shape including a long axis and a short axis, the long axis being oriented toward a center of the LED bracket.

6. The control panel assembly for the appliance according to claim 1, further comprising:
   a knob guide disposed at a center of the LED bracket; and
   a rotary knob rotatably mounted on the knob guide,
   wherein the plurality of light guide holes are arranged around the rotary knob.

7. The control panel assembly for the appliance according to claim 6, wherein the knob guide comprises a plurality of through holes formed in positions corresponding to the plurality of plurality of light guide holes.

8. The control panel assembly for the appliance according to claim 1, wherein a step is formed between the first portion and the second portion.

9. The control panel assembly for the appliance according to claim 8, wherein the step comprises a ridge or flash formed by injection molding the LED bracket.

10. The control panel assembly for the appliance according to claim 1, wherein the LED window is configured to allow the light emitted from the plurality of LEDs and guided through the plurality of light guide holes to be visible at a front of the control panel.

11. The control panel assembly for the appliance according to claim 10, wherein the LED window is formed by a sheet of film.

12. The control panel assembly for the appliance according to claim 10, wherein the LED window comprises:
   a light transmission part configured to allow the light emitted from the plurality of LEDs to be transmitted to the front of the control panel; and
   a light diffusion part configured to allow the light emitted from the plurality of LEDs to be uniformly diffused when passing through the light transmission part, and the light diffusion part comprises a film member attached to or inserted into the LED window.

13. The control panel assembly for the appliance according to claim 12, wherein the light transmission part comprises a plurality of light transmission protrusions disposed in positions corresponding to the plurality of light guide holes on a path of the light emitted from the plurality of LEDs, and the plurality of light guide holes are provided in a polygonal form so as to prevent the light emitted from the plurality of LEDs from being diffused.

14. A control panel assembly for an appliance, comprising:

a control panel;

a plurality of light emitting diodes (LEDs);

an LEDs bracket to accommodate the plurality of LEDs, the LED bracket including a plurality of light guide holes, each of the plurality of light guide holes being configured to guide light from one of the plurality of LEDs; and an LED window disposed in front of the LED bracket, wherein each of the plurality of light guide holes comprises:

a first portion to accommodate one of the plurality of LEDs, the first portion having an opening with a circular cross-section, and a second portion to guide light emitted from the LED accommodated in the first portion towards the LED window, the second portion having an exit with a polygonal form cross section, wherein a cross-sectional area of the first portion decreases toward the second portion, and a cross-sectional area of the second portion increases toward the LED window.

15. The control panel assembly according to claim 14, wherein the polygonal form includes a shape including a long axis and a short axis, the long axis being oriented toward a center of the LED bracket.

16. The control panel assembly for the appliance according to claim 14, wherein a step is formed between the first portion and the second portion.

* * * * *

UNITED STATES PATENT AND TRADEMARK OFFICE
CERTIFICATE OF CORRECTION

| | |
|---|---|
| PATENT NO. | : 9,086,216 B2 |
| APPLICATION NO. | : 14/535847 |
| DATED | : July 21, 2015 |
| INVENTOR(S) | : Jong Won Park |

Page 1 of 1

It is certified that error appears in the above-identified patent and that said Letters Patent is hereby corrected as shown below:

In the claims

Claim 4, Column 8, Line 31

Delete "cross section." and insert --cross-section.--, therefor.

Claim 7, Column 8, Line 45

After "of" delete "plurality of".

Claim 14, Column 10, Line 9

Delete "cross section," and insert --cross-section,--, therefor.

Signed and Sealed this

Thirteenth Day of October, 2015

Michelle K. Lee
*Director of the United States Patent and Trademark Office*